United States Patent [19]

Daiga

[11] 4,006,003
[45] Feb. 1, 1977

[54] PROCESS FOR MELTING GLASS

[75] Inventor: Valdis R. Daiga, Toledo, Ohio

[73] Assignee: Owens-Illinois, Inc., Toledo, Ohio

[22] Filed: Oct. 29, 1975

[21] Appl. No.: 626,692

[52] U.S. Cl. ................................. 65/135; 65/136; 432/13; 432/20
[51] Int. Cl.² ........................................ C03B 5/04
[58] Field of Search ............. 65/134, 135, 136, 335; 432/13, 20, 22

[56] References Cited

UNITED STATES PATENTS

| | | | |
|---|---|---|---|
| 1,468,008 | 9/1923 | Dyson | 110/22 |
| 1,513,828 | 11/1924 | Kernohan et al. | 432/22 |
| 1,715,584 | 6/1929 | Wetmore | 110/104 |
| 2,111,908 | 3/1938 | Andrews | 110/22 |
| 2,284,708 | 6/1942 | Woolley | 110/22 |
| 2,354,324 | 7/1944 | Longenecker | 432/22 |
| 2,550,390 | 4/1951 | Stephanoff | 241/1 |
| 2,584,805 | 2/1952 | Leftwich | 60/39.05 |
| 2,860,449 | 11/1958 | Paxton | 65/134 |
| 3,207,558 | 9/1965 | Kodama et al. | 302/16 |
| 3,241,505 | 3/1966 | Long et al. | 110/22 |
| 3,256,842 | 6/1966 | Vigneron et al. | 431/46 |
| 3,288,451 | 11/1966 | Worner | 65/347 |
| 3,350,185 | 10/1967 | Rough | 65/32 |
| 3,353,941 | 11/1967 | Hanks et al. | 65/134 X |
| 3,515,529 | 6/1970 | Love et al. | 65/27 |
| 3,969,068 | 7/1976 | Miller et al. | 65/136 X |

OTHER PUBLICATIONS

"Pulverized Coal–Air Burners for Glass Tanks", *Glass Industry*, Mar. 1975, pp. 12–14, 25.
*Fuels & Their Combustion*, pp. 134–136, McGraw-Hill Book Co. Inc., 1926.
*Fuels & Their Utilization*, Pitman Publishing Corp., 1940, pp. 62–63.
"Laboratory & Field Test on Coal in Oil Fuels", *Transactions of the A.S.M.E.*, Apr. 1944, pp. 185 et seq.
*Fuels ı Combustion Handbook*, McGraw-Hill Book Co. Inc., 1951, pp. 226–234.
*The Efficient Use of Fuel*, p. 292, London, 1958.
"Energy Gap for Glass", *Glass Industry*, Nov., 1971, pp. 392–395.

*Primary Examiner*—Arthur D. Kellogg
*Attorney, Agent, or Firm*—Robert F. Rywalski; Howard G. Bruss, Jr.; E. J. Holler

[57] ABSTRACT

A process is provided for melting glass forming ingredients by supplying all, or at least part, of the total heat required for such melting from the combustion of a combustible fuel which is an admixture of particulate coal and oil. The melting operating can be accomplished without any difficulty of temperature control and with no adverse effects on the quality or composition of the final glass. Excellent results are obtained employing, for example, a combustible fuel mixture of about 40% by weight of particulate coal having a particle size less than about 200 mesh and about 60% by weight of Number 2 fuel oil.

8 Claims, No Drawings

PROCESS FOR MELTING GLASS

The present invention is directed to the art of glass manufacturing and more particularly is directed to the art of melting glass forming ingredients to form a molten pool of glass.

It is well known in the art that glass is generally manufactured by supplying heat to glass forming ingredients whereby they are converted to a molten pool of glass. Typically this is done by burning a combustible fuel which, commercially, is natural gas or oil. For example glass forming ingredients are discharged into a furnace containing a pool of glass and the heat from the combustion of these fuels are employed to not only melt the ingredients but also to maintain the glass as a molten pool. In a reversing regenerative type furnace, for example, glass forming ingredients are discharged into a melting chamber having a pool of glass and heat is supplied by the combustion of a combustible fuel to melt these ingredients; a gaseous medium also flows across the melter, above the surface of the pool, which gaseous medium then passes through a checker system wherein heat is extracted from that gaseous medium and then on a reversal the heat is in turn extracted from that checker system and used to preheat the air as it passes into the melting chamber in a sequential reversed flow.

Colloidal fuels have been known for numerous years and endeavors have been made with regard to their use in the electric power generating, steel, and cement industries. While known for such a long time however, the desirability of using colloidal fuels, i.e., mixtures of coal and oil, in the glass manufacturing industry has not been recognized.

Quite surprisingly applicant has found that, in a method of manufacturing glass, the desired melting operation can be expediently and economically performed with excellent temperature control and without adverse impact on glass quality by employing as the combustible fuel a mixture of particulate coal and oil. This combustible mixture can be totally or partially employed in any of the well known methods for manufacturing glass.

The combustible mixtures of particulate coal and fuel oil which will produce quite desirable results is a composition of less than about 52% by weight of coal, e.g. 2 or 3 to 52%, with the balance being an appropriate combustible oil such as, for example, Number 2 fuel oil. Especially suitable results are obtained employing a composition of between about 27 to about 52% by weight of coal and about 73 to about 48% by weight of Number 2 fuel oil. Desirably the coal will have a particle size of less than about 200 mesh. When fuel oils are employed which are more (or less) viscous than Number 2 fuel oil, e.g., Number 4, or Number 6 (Bunker C) fuel oil, desirably the concentrations of coal and oil will be adjusted to produce a viscosity of the particulate coal and oil mixture of less than about 820 centipoise as measured by a Brookfield Viscometer. Of course, the temperature of the mixture can also be varied, as by preheating, to obtain the desired viscosity. Quite desirable results will be obtained by employing a coal and oil admixture having a viscosity of between about 13 to 14 centipose to about 820 centipoise with an especially suitable operation being obtained at a viscosity of around 65 to 70 centipoise. The slurries of the powdered coal and oil may be manufactured using conventional agitating equipment supplied to the burner as preslurried fuel. Such use of a preslurried fuel supply is highly desirable since, from an economy, safety and health, and space viewpoint it allows for preparation in an area remote from the glass melting area.

The present invention, in a more preferred procedure, is employed in methods of manufacturing glass wherein a flow of a gaseous medium for example a gaseous medium of combustion products and air is maintained over a pool of molten glass. By maintaining a sufficient velocity of this flow residual ash, from the burning of the coal, can be maintained in suspension in the gaseous flow and the ash thereby pneumatically conveyed from the glass melter out of appropriate ports therein without allowing the ash to be brought into contact with the molten glass or any batch ingredients carried by the surface thereof. In this manner by adjusting the velocity of the gaseous flow above the surface of the glass substantially all of the residual ash can be removed without allowing it to come into contact with the molten pool beneath it. The velocities may be adjusted and generally it will be found that by employing velocities of at least about 12 ft. per second, and desirably at least about 20, above the pool substantially all, for example, at least about 95% and more typically at least about 99% of the residual ash will be removed in this manner. Surprisingly, the usual velocities in a regenerative glass melting furnace may even be sufficient for this purpose. Thus, whether the melting be done in a regenerative type glass melting furnace, or a recuperator type glass melting furnace, or even in a unit melter, in a highly preferred embodiment of the present invention, a flowing gaseous medium will be provided above the pool of glass which is present, or will be present, with the velocity of this flowing gaseous medium being sufficient to pneumatically convey substantially all of the ash residue out of the melter so as to not allow contact with the pool of glass therein. Thus, for example, in a regenerative type reversing glass melting furnace, wherein glass forming ingredients are discharged onto a pool of glass and a combustible fuel is burned above the surface of the pool so as to produce a source of heat to convert the ingredients to a homogeneous molten glass, the combustible fuel will desirably be a mixture of −200 mesh coal and oil and the flow of gaseous medium above the glass pool, which can be adjusted either by adjusting the draft or by adjusting the air blowers, will be of a sufficient velocity to suspend the ash particles therein and pneumatically removed them from the melting chamber. Of course as will be readily apparent, if the final glass composition is compatible with the ash in the coal, which is a glass forming ingredient in itself, there will be no need to remove such ash from the melter. If a unit melter is employed, or a batch melter the same procedure may be followed. That is in the preferred practice the burner will be located above the level of the pool of molten glass which will be obtained when the glass forming ingredients are melted and, if the glass is compatible with the ash, the combustible fuel is simply supplied to the burner and ignited or, if desired, sufficient velocity of gas flow is provided in the melting chamber, above the predetermined level of the pool of glass, to suspend the ash particles therein and pneumatically convey them out of the melter.

While the foregoing will enable one skilled in the art to make and use the present invention there nonetheless follows further exemplification of the present invention.

EXAMPLE

A two-phase run was made in a commercial glass melting furnace with a typical soda-lime container glass composition. The specific composition was that for producing a green colored glass with a silica content of about 71.9%, an alumina content on the order of about 1.7% a CaO content on the order of about 10.7%, and an $Na_2O$ content on the order of about 14.6%; the remaining constitutents were small amounts of those well known in the glass container art and included a colorant. The glass melting furnace itself had a size of about 800 sq. ft. and was a five port, side port direct fired furnace of the reversing, regenerative type. As is well known in this type of furnace, a gaseous medium which is a mixture of air and combustion products flows in an alternating sequence above the level of the molten pool of glass in the melter and is directed out of the melting chamber through ports provided in the walls of the melting furnace. The specific furnace was a five port furnace with experimentation being done on the first port; i.e., the combustible fuel supplied to the first port was either natural gas, or oil alone, or an admixture of particulate coal and oil. The four ports disposed furthest from the batch charging area of the furnace were fired with natural gas. Thus except when the furnace was entirely fired with natural gas approximately 20% of the total heat input was supplied by either oil alone, or a mixture of coal and oil. The burner employed for the coal and oil fuel was a conventional oil burner, in this instance a Hauck 623 X burner using an atomization air pressure of about 25 ounces per sq. inch. The slurry of coal and oil was prepared as a pre-slurry employing a marine type propeller agitator and this premixed slurry was fed to the oil burner employing a conventional slurry pump, in this instance a Moyno pump supplied commercially by the Robins and Myers Company.

The coal which was employed was an anthracite coal having a particle size generally less than about 200 mesh (specifically here about 97% was −200 mesh material). The coal consisted of about 80% fixed carbon, about 13% ash, about 6% volatile matter, less than about 1% total moisture, and less than about 1% sulfur. The ash was comprised of a major amount of silica, on the order to about 55%; the remaining portion of the ash in turn was of a major amount of $Al_2O_3$ and the balance included metal oxides such as $Fe_2O_3$, $TiO_2$ alkaline earth oxides, and alkali oxides. The oil employed was standard Number 2 fuel oil.

The first phase of the experimentation was what would be considered a "shake-down" of the system to obtain basic processing information. The second phase of the experimentation was then directed to a more thorough technical evaluation of the coal and oil fuel on the glass melting operation. The pull on the glass melter was about 156 tons per day.

In the first phase of the experimental runs the burner was supplied with a combustible fuel of coal and oil and it was observed that, at a slurry concentration of about 52% by weight coal and about 48% by weight of Number 2 fuel oil, good atomization was difficult to obtain; this corresponds to an approximate viscosity of the particulate coal-oil slurry fuel of about 820 centipoise at 75° F. as measured by a Brookfield Viscometer. It was also observed that the flames produced from a slurry of coal and oil respectively having 27% by weight coal (73% oil) and 40% by weight coal (60% by weight oil) were more luminuous than oil alone. It was also observed that the flame configuration produced from a slurry of coal in oil approached that of the flame obtained from natural gas as opposed to the long narrow flame produced from oil alone. Additionally it was observed that no difficulties were encountered with burner plugging or with the coal settling from the slurry. Moreover a check of combustibles showed complete combustion of the coal-oil slurry fuel and substantially no excess oxygen.

Based on the first phase of the experimental run another run was made for a 28 hour period employing as the combustible fuel a mixture of 40% by weight of coal and 60% by weight of Number 2 fuel oil. The burner in the Number 1 port was disposed approximately 2 ft. above the level of the molten glass and was adjusted so that the flame was inclined downwardly towards the surface of the molten pool of glass with the end of the flame licking the upper surface of those batch ingredients which were floating upon the molten pool of glass. The flow of the gaseous medium above the molten pool of glass in the melter during each cycle of the firing operation; i.e., the flow of air along with the products of combustion was generally at a velocity of about 25 ft. per second. The ash which remains as a residue from the combustion or burning of coal in the coal-oil combustible mixture could be observed coming off the flame and being pneumatically conveyed in noncontacting relation to the pool of molten glass out of the melting chamber through the ports therein. That is, the velocity of the gaseous flow above the molten pool was sufficient to suspend substantially all of the residual ash from the burnt coal in the gas flow and by virtue of this flow the residual ash material was pneumatically conveyed from the melting chamber.

A comparison using only Number 2 fuel oil as the combustible fluid in Port 1, or natural gas as the fuel, relative to the use of the mixture of powdered coal and oil, showed, quite surprisingly, that no difficulty was encountered in controlling the flame or controlling the temperature when employing the oil and coal mixture. An extremely desirable turbulence was produced using the coal-oil slurry. Additionally, a check on the glass quality both by oxide analysis and by measuring the stone and seed content of the glass showed virtually no change in the quality or composition of the ultimately produced glass. While in pretrial batch melts it was determined that the ash of the coal was a glass forming material; the observation with respect to the quality of the glass and its analysis coupled with the visual observation of the ash being pneumatically conveyed from the melting furnace indicates that substantially all of the ash was pneumatically conveyed from the melter with very little, if any, of the ash entering into the melt. Thus the foregoing indicated that the temperature in the melter can be quite easily controlled with the oil and coal slurry used as the combustible fuel and that glass quality will be virtually unchanged. Hence, an admixture, or slurry, of powdered coal in oil can be employed as the combustible fuel to supply either all, or part, of the heat required to melt and form a high quality glass. In passing it should be mentioned that when reference is made herein and in the claims to using a mixture of coal and oil to melt glass forming ingredients and/or to form a molten pool of glass there is contemplated using the melting operation the slurry of coal and oil either to supply all, or part, of the heat for that purpose.

In measuring stack particulates it was observed that, relative to firing the furnace entirely with natural gas, the particulates in the effluent increase by about 70% when employing the slurry fuel of particulate coal in oil and this accounted for about 24% of the total ash added to the system. Of course, as will be apparent, suitable particulate collectors may be employed to isolate the particulates, including the coal ash.

I claim:

1. In a method of manufacturing glass comprising discharging glass forming ingredients unto a pool of molten glass and burning a combustible fuel above the surface of said pool so as to produce a source of heat to convert said ingredients to a molten glass the improvement wherein said fuel is a preslurried mixture of a coal and oil.

2. The improvement of claim 1 and further including flowing a gaseous medium above said pool of glass at a sufficient velocity to pneumatically convey substantially all of the ash residue of the burned coal above said pool and maintain substantially all of said ash in noncontacting relation to said pool.

3. The improvement of claim 2 wherein said velocity is at least about 12 feet per second.

4. The improvement of claim 1 wherein said coal has a particle size of less than about 200 mesh and wherein said mixture has a viscosity of less than about 820 centipoise.

5. The improvement of claim 4 wherein said fuel is about 40 weight percent coal and about 60 weight percent oil.

6. In a method of manufacturing glass comprising adding glass forming ingredients to a melting chamber, said ingredients being capable of being melted to form a pool of molten glass in said chamber, supplying a combustible fuel to a burner disposed in said chamber above the level of said pool and burning said fuel so as to provide heat to melt said ingredients and form a molten pool of glass, the improvement wherein said fuel comprises a preslurried mixture of particulate coal and fuel oil.

7. The improvement of claim 6 and further including maintaining a gaseous flow in said chamber above said pool of a velocity sufficient to suspend substantially all of the residual ash of the burned coal in said gas flow so as to pneumatically convey said ash from said chamber.

8. In a method for manufacturing glass comprising burning a combustible fuel so as to produce heat to convert glass forming ingredients to molten glass the improvement wherein said fuel is a preslurried admixture of particulate coal and oil.

* * * * *